US009758052B2

(12) United States Patent
Wu et al.

(10) Patent No.: US 9,758,052 B2

(45) Date of Patent: Sep. 12, 2017

(54) POWER SPIKE MITIGATION

(71) Applicant: Ford Global Technologies, LLC, Dearborn, MI (US)

(72) Inventors: Bo Wu, Northville, MI (US); Perry Robinson MacNeille, Lathrup Village, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 91 days.

(21) Appl. No.: 14/540,382

(22) Filed: Nov. 13, 2014

(65) Prior Publication Data

US 2016/0137089 A1 May 19, 2016

(51) Int. Cl.

| | |
|---|---|
| ***B60L 11/00*** | (2006.01) |
| ***B60L 11/18*** | (2006.01) |
| ***H04W 64/00*** | (2009.01) |
| ***G01S 3/30*** | (2006.01) |

(52) U.S. Cl.

CPC ............. *B60L 11/1861* (2013.01); *G01S 3/30* (2013.01); *H04W 64/00* (2013.01); *B60L 2240/627* (2013.01); *Y02T 10/7005* (2013.01)

(58) Field of Classification Search

CPC .............. B60L 11/1861; B60L 11/1862; B60L 2240/62; B60L 2240/642; B60L 2260/16; B60L 2260/50; B60L 2260/54; B60L 2240/627; H04W 64/00; G01S 3/30

See application file for complete search history.

(56) References Cited

U.S. PATENT DOCUMENTS

| | | | | |
|---|---|---|---|---|
| 6,344,732 | B2 * | 2/2002 | Suzuki | 180/65.1 |
| 6,487,477 | B1 * | 11/2002 | Woestman | B60K 6/365 180/65.235 |
| 6,621,244 | B1 * | 9/2003 | Kiyomiya | B60K 6/485 180/65.26 |
| 6,868,318 | B1 * | 3/2005 | Cawthorne | B60L 11/005 307/10.1 |
| 6,882,913 | B2 | 4/2005 | Bullister et al. | |
| 7,548,805 | B2 | 6/2009 | Yamaguchi et al. | |
| 8,290,666 | B2 | 10/2012 | Turski et al. | |
| 8,863,540 | B2 * | 10/2014 | Alston | B60H 1/00428 165/43 |
| 9,529,075 | B2 * | 12/2016 | Seitz | G01S 5/10 |
| 2001/0024104 | A1 * | 9/2001 | Suzuki | B60K 6/48 320/104 |
| 2004/0020695 | A1 | 2/2004 | Potter | |
| 2008/0288132 | A1 * | 11/2008 | King | B60L 11/123 701/22 |

(Continued)

FOREIGN PATENT DOCUMENTS

| | | |
|---|---|---|
| JP | 04194333 | 7/1992 |

*Primary Examiner* — Thomas G Black

*Assistant Examiner* — Peter D Nolan

(74) *Attorney, Agent, or Firm* — Jennifer Stec; Bejin Bieneman PLC

(57) ABSTRACT

A vehicle system includes a processing device programmed to monitor a vehicle battery, predict a vehicle maneuver, and determine whether the vehicle battery has sufficient charge for a vehicle to execute the predicted maneuver. The processing device is further programmed to perform a preparatory action if the vehicle battery lacks sufficient charge for the vehicle to execute the predicted maneuver.

20 Claims, 5 Drawing Sheets

(56) References Cited

U.S. PATENT DOCUMENTS

2008/0306670 A1* 12/2008 Masterson ............... B60K 6/26 701/99
2010/0265050 A1* 10/2010 Skaff ...................... B60K 6/448 340/438
2011/0098922 A1* 4/2011 Ibrahim ................ B60W 40/08 701/532
2011/0264317 A1* 10/2011 Druenert .................. B60K 6/48 701/22
2011/0288712 A1* 11/2011 Wang ..................... B60K 6/445 701/22
2012/0294231 A1* 11/2012 Finlow-Bates ....... H04W 48/14 370/328
2013/0024069 A1* 1/2013 Sakamoto .......... G01R 31/3693 701/36
2013/0274952 A1* 10/2013 Weslati ............. B60W 50/0097 701/1
2013/0278054 A1* 10/2013 Kritt ......................... H02J 1/14 307/10.1
2014/0018111 A1 1/2014 Farley et al.
2014/0162219 A1* 6/2014 Stankoulov .......... G09B 19/167 434/65
2015/0006052 A1* 1/2015 Sannodo ......... B60W 30/18109 701/70
2015/0183293 A1* 7/2015 Kim ................... B60H 1/00735 165/202

* cited by examiner

POWER SPIKE MITIGATION

BACKGROUND

Electric vehicles rely on a traction battery or fuel cell battery for propulsion. Hybrid vehicles use a traction battery that can propel the vehicle alone or with a gasoline engine. Typically, traction batteries in both electric and hybrid vehicles provide electrical power to an electric motor, causing an output shaft of the motor to generate torque. The output shaft of the motor is connected to the drivetrain so torque can be used to propel the vehicle. The amount of torque generated is related to the design and state of charge of the battery.

DETAILED DESCRIPTION

Some vehicle maneuvers require more power than others. An example of a high-power maneuver may include executing a left turn at a traffic control device or onto a main road from a side road. Other high-power maneuvers may include a ramp entrance onto a freeway and passing on a two-way road with a single lane in each direction. More power is needed from the traction battery during high-power maneuvers. Such power may not be available, however.

During operation of an electric of hybrid vehicle, the state of charge of the traction battery gets depleted. If the state of charge is depleted too much, the vehicle will not be able to sufficiently perform the high-power maneuver. The state of charge can be increased by, e.g., plugging the traction battery into a power source such as an AC outlet (electric vehicles) or a built-in generator (hybrid vehicles). There is not always time to charge the traction battery before the vehicle is faced with a high-power maneuver situation.

One way to provide sufficient battery power is for a vehicle system to monitor the state of charge of the traction battery, predict when the vehicle will need to execute a high-power maneuver, and determine whether the vehicle battery has sufficient charge for the vehicle to execute the predicted high-power maneuver. The vehicle system can further perform a preparatory action if the vehicle battery lacks sufficient charge for the vehicle to execute the predicted maneuver. Examples of preparatory actions may include pre-charging the traction battery, generating an alert to warn the driver of the lack of sufficient power, performing a load shedding action (e.g., turning off the air conditioning or other power draining vehicle subsystems), or the like.

Although generally discussed in the context of providing power via an on-board battery, a similar concept may apply to other powertrain components, as discussed in greater detail below. For example, a turbo charger may be held at a high-speed to reduce turbo-lag and maintain high boost pressure prior to the vehicle executing a high-power maneuver that may cause a drop in boost pressure when the maneuver is executed. Moreover, a transmission may be held in a lower gear to prepare the vehicle for the high-power maneuver.

The elements shown may take many different forms and include multiple and/or alternate components and facilities. The example components illustrated are not intended to be limiting. Indeed, additional or alternative components and/or implementations may be used.

Figure 1:
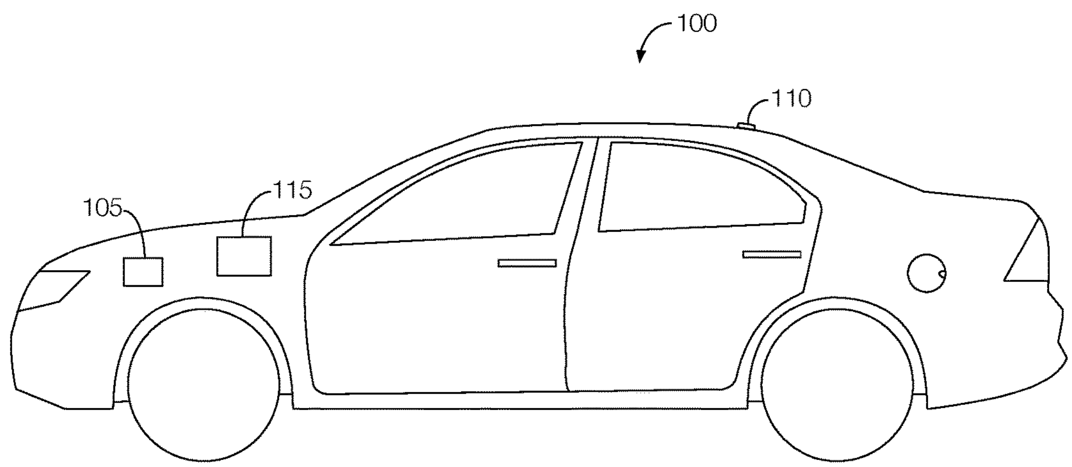
FIG. 1 illustrates an example vehicle having a system for preserving battery power for battery-intensive vehicle maneuvers.

As illustrated in FIG. 1, the vehicle 100 includes an on-board battery 105, an antenna 110, and a vehicle system 115. Although illustrated as a sedan, the vehicle 100 may include any passenger or commercial automobile such as a car, a truck, a sport utility vehicle, a crossover vehicle, a van, a minivan, a taxi, a bus, etc. In some possible approaches, the vehicle 100 may be an autonomous vehicle configured to operate in an autonomous (e.g., driverless) mode, a partially autonomous mode, and/or a non-autonomous mode.

The on-board battery 105 may be configured to output electrical energy to one or more vehicle subsystems. In one possible approach, the on-board battery 105 may include a traction battery configured to provide electrical energy to a motor configured to generate a torque used to propel the vehicle 100. The amount of torque generated may be related to the state of charge of the on-board battery 105. The "state of charge" may refer to how "full" the on-board battery 105 is. Therefore, the state of charge may be used to determine how much electrical energy the on-board battery 105 can output before it needs to be recharged.

The antenna 110 may be configured to receive radio frequency signals. The antenna 110 may convert the received radio frequency signals into electrical signals. As discussed in greater detail below, the antenna 110 may be configured to simultaneously receive multiple radio frequency signals from different directions. Moreover, the antenna 110 may be divided into two or more sections, and each section may be configured to receive radio frequency signals. The sections that receive certain signals, as well as the strength of the signals received, can be used to determine the orientation and position of the vehicle 100. The antenna 110 may include an internal antenna configured to receive signals from devices inside the vehicle 100 or an external antenna configured to receive signals generated from outside the vehicle 100.

The vehicle system 115 may be configured to predict when the vehicle 100 needs to execute a high-power maneuver and determine whether the on-board battery 105 has a sufficient state of charge for the vehicle 100 to perform the maneuver. If the state of charge is insufficient, the vehicle system 115 may take an appropriate preparatory action. Examples of preparatory actions may include pre-charging the on-board battery 105 or performing a load shedding action (e.g., turning off the air conditioning or other power draining vehicle subsystems). Pre-charging the on-board battery 105 may increase the state of charge so that the vehicle 100 can properly execute the high-power maneuver. While load shedding may not increase the state of charge, it may increase the amount of electrical energy available to assist the vehicle 100 during the maneuver.

Another possible preparatory action may include generating an alert to warn the driver of the lack of sufficient power or suggest the driver take an alternate route that either avoids the high-power maneuver or would require execution of a lower power maneuver. For example, the alert may advise the driver not to perform a passing maneuver on a single-lane, two way road since the vehicle 100 will not be able to speed up enough to overtake the lead vehicle. Another possible alert may recommend that a driver not turn left at an upcoming intersection. Instead, the alert may propose a series of right turns (e.g., a lower power maneuver) to avoid having to turn left (e.g., a high-power maneuver).

The alert may further notify the driver when the state of charge has been sufficiently replenished to perform the maneuver. In the case of hybrid vehicles, the on-board battery 105 can be charged by a gasoline engine or generator motor. The alert may notify the driver when the on-board battery 105 has been recharged and is able to provide sufficient power for the vehicle 100 to perform high-power maneuvers.

Figure 2:
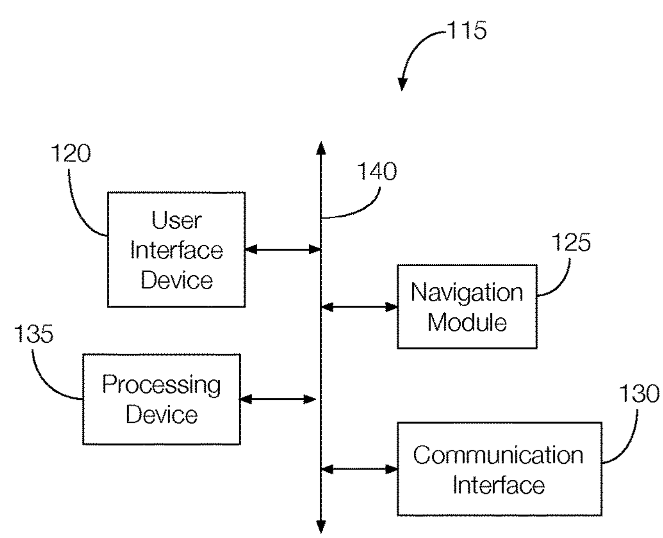
FIG. 2 is a block diagram of example components of the vehicle system of FIG. 1.

FIG. 2 is a block diagram showing example components of the vehicle system 115. As illustrated, the vehicle system 115 includes a user interface device 120, a navigation module 125, a communication interface 130, and a processing device 135. The components of the vehicle system 115 may communicate with other vehicle components and with one another via a communication bus 140, such as a Controller Area Network (CAN) bus.

The user interface device 120 may be configured to present information to a user, such as a driver, during operation of the vehicle 100. Moreover, the user interface device 120 may be configured to receive user inputs. Thus, the user interface device 120 may be located in the passenger compartment of the vehicle 100. In some possible approaches, the user interface device 120 may include a touch-sensitive display screen. During operation of the vehicle 100, the driver or another occupant may be prompted to calibrate the vehicle system 115. Calibrating the vehicle system 115 may include the user interface device 120 receiving a user input indicating the present location of the vehicle 100. The present location may be identified generally by, e.g., zip code or intersection, or more specifically by, e.g., GPS coordinates or geodetic coordinates. An example of a geodetic coordinate system includes the World Geodetic System (WGS). Moreover, the user interface device 120 may be used to present the alerts discussed above to the driver or other occupant.

The navigation module 125 may be configured to determine a position of the vehicle 100, such as a current location of the vehicle 100. The navigation module 125 may include a Global Positioning System (GPS) or a time-of-flight system such as the Global Navigation Satellite System (GNSS) receiver configured to triangulate the position of the vehicle 100 relative to satellites or terrestrial based transmitter towers. The navigation module 125, therefore, may be configured for wireless communication. The navigation module 125 may be further configured to develop routes from the current location to a selected destination, as well as display a map and present driving directions to the selected destination via, e.g., a user interface device 120. In some instances, the navigation module 125 may develop the route according to a user preference. Examples of user preferences may include maximizing fuel efficiency, reducing travel time, travelling the shortest distance, or the like.

The communication interface 130 may be configured to facilitate wired or wireless communication between the components of the vehicle 100 and other devices, such as the remote server or even another vehicle when using, e.g., a vehicle-to-vehicle communication protocol. The communication interface 130 may be configured to receive messages from, and transmit messages to, a cellular provider's tower and the Service Delivery Network (SDN) associated with the vehicle 100 that, in turn, may establish communication with a user's mobile device such as a cell phone, a tablet computer, a laptop computer, a fob, or any other electronic device configured for wireless communication via a secondary or the same cellular provider. Cellular communication to the telematics transceiver through the SDN may also be initiated from an internet connected device such as a PC, Laptop, Notebook, or WiFi connected phone. The communication interface 130 may also be configured to communicate directly from the vehicle 100 to the user's remote device or any other device using any number of communication protocols such as Bluetooth®, Bluetooth® Low Energy, or WiFi. An example of a vehicle-to-vehicle communication protocol may include, e.g., the dedicated short range communication (DSRC) protocol (IEEE 1 p). The communication interface 130 may be further or alternatively configured to receive messages from, and transmit messages to, a remote server.

The processing device 135 may be programmed to monitor the state of charge of the on-board battery 105, predict when the vehicle 100 is about to execute a high-power maneuver, and determine whether the on-board battery 105 has sufficient charge for the vehicle 100 to execute the predicted maneuver. The processing device 135 is programmed to perform a preparatory action if the on-board battery 105 lacks sufficient charge for the vehicle 100 to execute the predicted maneuver. Examples of preparatory actions may include pre-charging the on-board battery 105 or performing a load shedding action (e.g., turning off the air conditioning or other power draining vehicle subsystems). As discussed above, pre-charging the on-board battery 105 may increase the state of charge so that the vehicle 100 can properly execute the high-power maneuver. The on-board battery 105 can be charged via a generator motor, or other device. Load shedding may include the processing device 135 commanding one or more energy-intensive vehicle subsystems to turn off. For instance, the processing device 135 may temporarily command the climate control system to turn off until, e.g., after the high-power maneuver has been executed. While load shedding may not increase the state of charge, it may increase the amount of electrical energy available to assist the vehicle 100 during the maneuver. Another possible preparatory action discussed above may include generating an alert to warn the driver of the lack of sufficient power or suggest the driver take an alternate route that avoids the high-power maneuver. Therefore, the processing device 135 may command the user interface device 120 to present the alert or alternate route to the driver. Additionally, or in the alternative, the processing device 135 may command the user interface to instruct the driver or other occupant when the state of charge has been sufficiently replenished for the vehicle 100 to execute the high-power maneuver.

The processing device 135 may be programmed to predict when the vehicle 100 will execute a high-power maneuver. The prediction may be based on data from various sources. For instance, the processing device 135 may be programmed to make the prediction from historical driving habits, signals received over the communication bus 140, signals received from a cloud-based server, or the like. In the case of the communication bus 140, the processing device 135 may be programmed to monitor the communication bus 140 for signals representing, e.g., steering wheel angle, whether a turn indicator has been turned on (i.e., outputting a turn indicator signal), etc. Other data may include signals from the navigation module 125 representing the location of the vehicle 100. For instance, the processing device 135 may be programmed to consider the signals over the communication bus 140 and the location of the vehicle 100 to determine, e.g., whether the vehicle 100 is approaching a high-power maneuver such as a left turn at an upcoming intersection or a freeway on-ramp. For example, the signals output by the navigation module 125 may indicate that the vehicle 100 is approaching an intersection, and the signals output by the turn indicator may indicate that the driver intends to turn left. The steering wheel angle used in combination with the location information may indicate that the vehicle 100 is attempting to merge onto a freeway or pass another vehicle 100 on a single-lane, two-way road.

Another way to determine the location of the vehicle 100 may be through signals received via the antenna 110. As shown with regard to FIG. 3, the antenna 110 may be separated into multiple sections, each able to receive radio signals. The processing device 135 may be programmed to determine which signals are received by each section and the strength of the signals received. The gain of the antenna 110 may depend upon the direction from which the radio signals are received. The antenna field pattern may be used by the processing device 135 to determine the location of the vehicle 100. The processing device 135 may be programmed to use the antenna profile in combination with historical driving data to predict high-power maneuvers. For instance, barring new communication towers, the antenna profile will be substantially the same each time a vehicle 100 drives through a particular location. If the processing device 135 observes that a high-power maneuver (e.g., a left turn through an intersection) frequently occurs following receipt of a particular antenna profile, the processing device 135 may take a preparatory action each time the antenna profile is recognized.

In another possible approach, the processing device 135 may be programmed to predict high-power maneuvers from signals received from infrastructure devices configured to wireless communication. Examples of infrastructure devices may include traffic control devices, bridges, tunnels, telephone poles, roadside signs, etc. The infrastructure device may transmit a signal indicating that the vehicle 100 is approaching an area where a high-power maneuver may be necessary. Thus, the processing device 135 may be programmed to predict the high-power maneuver and take a preparatory action in response to receiving such a signal.

In some instances, the processing device 135 may be programmed to predict whether a high-power maneuver will be needed based on signals received from a remote server. The remote server may aggregate information from other vehicles or infrastructure devices. The aggregated information may be associated with a location such as GPS or geodetic coordinates. When the vehicle 100 approaches the location, the processing device 135 may be programmed to generate a query and command the communication interface 130 to transmit the query to the remote server. The remote server may respond to the query with a signal that presents information about an upcoming area along the path of the vehicle 100. For example, the information from the remote server may indicate that the vehicle 100 is approaching a freeway on ramp or a single-lane, two-way road where passing is permitted. The processing device 135 may be programmed to predict whether a high-power maneuver may be needed based on this or other information transmitted from the remote server.

Figure 3:
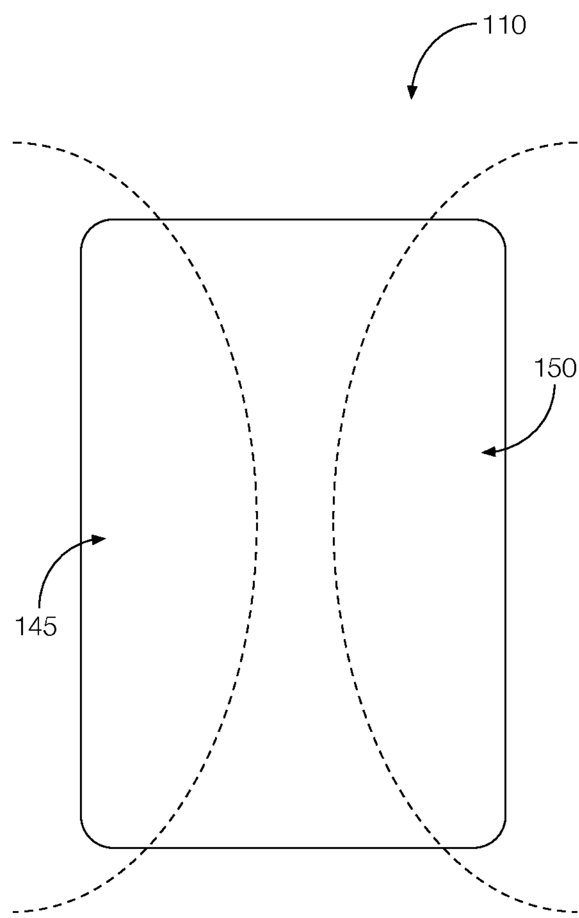
FIG. 3 illustrates an example antenna for implementing the fingerprinting technique.

FIG. 3 illustrates an example antenna 110 for implementing the fingerprinting technique. The antenna module 110 may be separated into multiple antennas each oriented differently with an asymmetric field pattern such that a signal coming from a specific direction with a specific polarization produces a unique signature composed of amplitude, signal-noise ratio, etc. For purposes of simplicity, the field patterns for two antennas are shown in FIG. 3. A first section 145 may be located on one side of the vehicle 100 while a second section 150 may be located on another side of the vehicle 100. Antenna signals from different sources, or scattered or reflected by objects in the transmission path (multipath effect) may approach the vehicle 100 from multiple directions, and the signal strength of each signal may be different for each section. In other words, the first section 145 may receive antenna signals of different strengths than the second section 150.

The radio signals modified by the antenna gain may be used to generate the location signal profile at any instant in time. The location fingerprint can be determined from the location signal profile. The location fingerprint may be defined by the transmission frequencies of the signal sources that are received, the signal strength, the signal-to-noise and distortion ratio, Doppler shift, etc. The location fingerprint may be unique to the vehicle location. Therefore, the location fingerprint may be used to determine the location of the vehicle 100. Moreover, by placing the first and second section 150 on different parts of the vehicle 100, the location fingerprint may be used to determine the direction the vehicle 100 is travelling. Another way to determine the travelling direction of the vehicle 100 is to incorporate Doppler shift into the location fingerprint. On the one hand, if the vehicle 100 is moving toward the source of the signal, the frequency will shift to a higher frequency. On the other hand, if the vehicle 100 is moving away from the source of the signal, the frequency will shift to a lower frequency.

The location fingerprint, the location signal profile, and the reference point (e.g., the coordinates of the vehicle 100) may be related to one another and stored in a database. The database may be stored in the cloud-based computing system, and the reference point may be transmitted to the vehicle 100 in response to a query for the reference point based on the location signal profile, the location fingerprint, or both.

Figure 4:
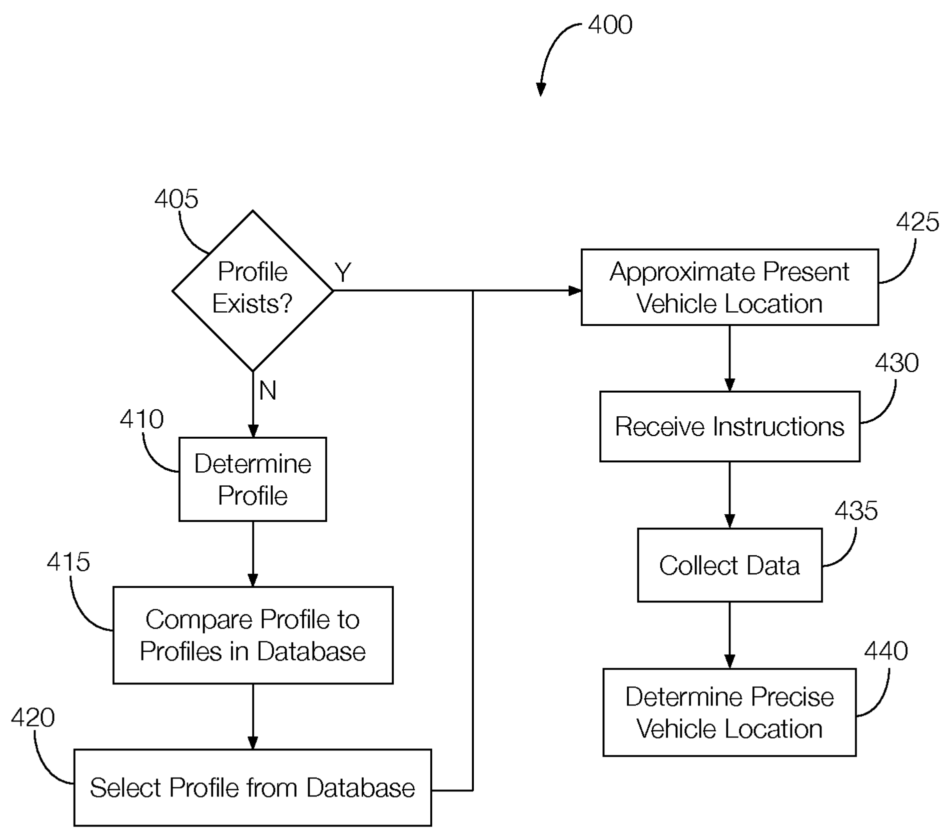
FIG. 4 illustrates a flowchart of an example fingerprinting technique that may be implemented by the vehicle system.

FIG. 4 illustrates an example process 400 for implementing a fingerprinting technique using the antenna 110 described above with regard to FIG. 3 and possibly other components of the vehicle 100. The process 400 may be executed by, e.g., the processing device 135. In some instances, the process 400 may be continually executed while the vehicle 100 is turned on.

At decision block 405, the processing device 135 may determine whether an antenna profile is known to exist for the present location of the vehicle 100. By monitoring the antenna signals, the processing device 135 may determine whether the antenna 110 is receiving signals from one or more radio broadcast towers or other signal sources as well as the antenna profile for the received signals. Alternatively, the processing device 135 can query the remote server to determine whether the antenna profile exists. If the processing device 135 determines that the antenna profile for that location does not currently exist (which may occur if the vehicle 100 has not recently travelled to that location), the process 400 may continue at block 410. Otherwise, if the antenna profile already exists, the process 400 may continue at block 425.

At block 410, the processing device 135 may determine the location signal profile, the location fingerprint, or both, at the present location of the vehicle 100. For instance, the processing device 135 may scan the received signals using a radio frequency receiver for a list of nearby broadcast towers or other signal sources. The processing device 135 may further record the transmission frequencies, signal strengths, signal-to-noise and distortion ratios, Doppler shifts, etc., of the received signals.

At block 415, the processing device 135 may compare the location fingerprint to profiles stored in a profile database associating location fingerprint or location signal profiles with particular geographic locations (e.g., reference points). The profile database may be stored in an on-board memory device or stored remotely via, e.g., the remote server. As discussed above, the remote server may include a cloud-based computing system.

At block 420, the processing device 135 may select one of the reference points in the profile database as the closest to the location fingerprint generated at block 410. If multiple reference points in the profile database match the antenna profile generated at block 410, or if the processing device 135 is otherwise unable to select one reference point as a match, the processing device 135 may present a list of likely locations and prompt the driver or other occupant to select the correct location via, e.g., the user interface device 120. The selected reference point may be stored in the profile database with the location signal profile, location fingerprint, or both. If uploaded to the remote server, the selected reference point may be made available to subsequent vehicles that travel through that location.

At block 425, the processing device 135 may approximate the present vehicle location via, e.g., a dead-reckoning technique. That is, the processing device 135 may estimate the present location based on how far the vehicle 100 has travelled since its last known location, whether the vehicle 100 has turned, the degree of any turns executed, etc.

At block 430, the processing device 135 may receive instructions with the type of data to collect to determine a more precise location of the vehicle 100. The instructions may command the processing device 135 to generate the location signal profile or location fingerprint by, e.g., associating the antenna signals with transmission frequencies, signal strengths, signal-to-noise and distortion ratios, Doppler shifts, etc., of the received signals.

At block 435, the processing device 135 may collect the data identified in the instructions received at block 430. The processing device 135 may scan the antenna 110 for received signals, associate the signal with a particular signal strength, determine the frequency of the received signal, determine which part of the antenna 110 (e.g., the first section 145 or the second section 150) received the signal, etc.

At block 440, the processing device 135 may determine a precise location of the vehicle 100 based on the collected data. In some instances, the processing device 135 may transmit the collected data to the remote server for processing. Therefore, the precise location may be based on a response sent from the remote server. Alternatively, the processing device 135 may determine the precise location by comparing the collected data to data stored in, e.g., the profile database or another database associating antenna profiles to geographic locations.

Figure 5:
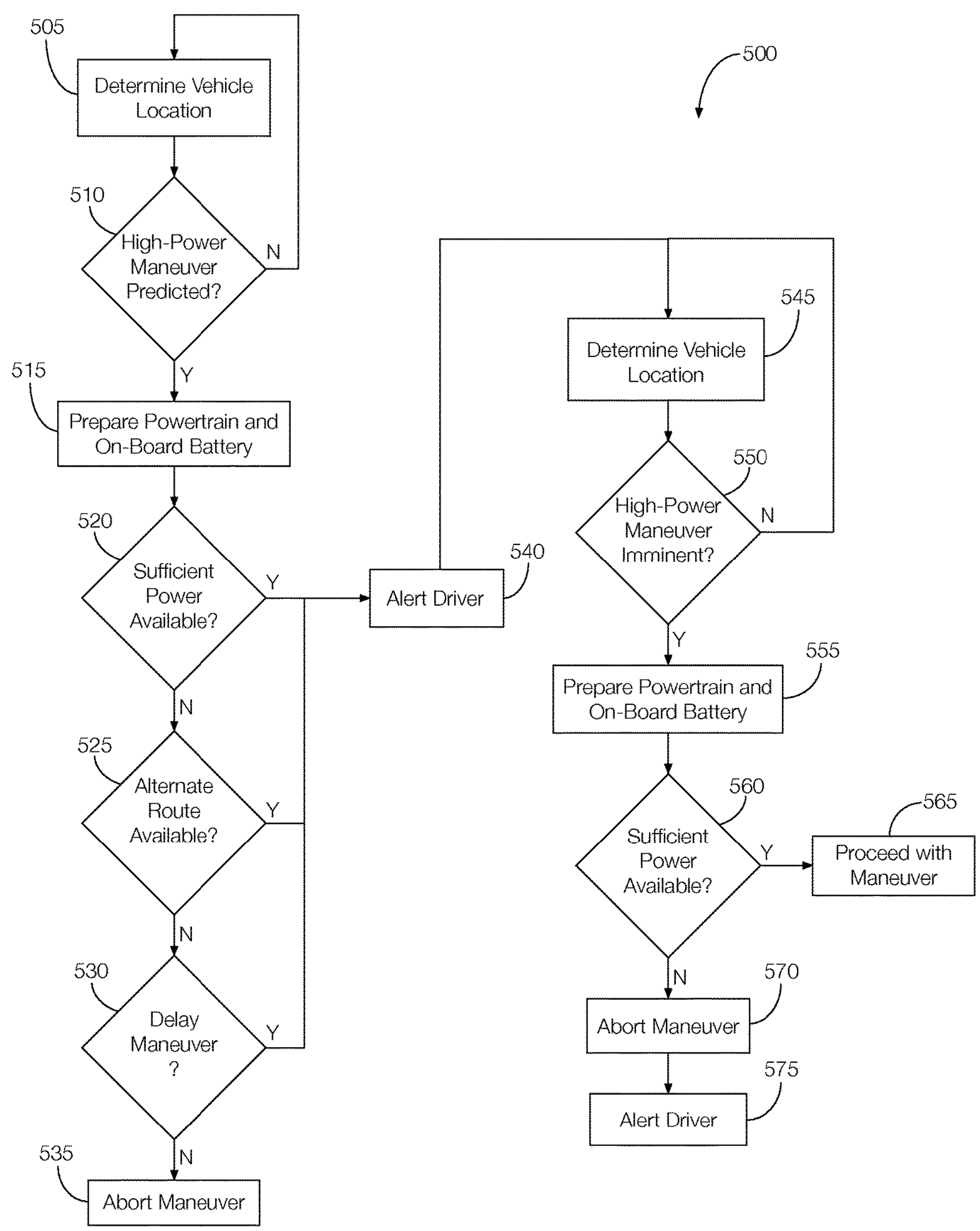
FIG. 5 is a flowchart of an example process that may be executed by the vehicle system to preserve battery power for battery-intensive vehicle maneuvers.

FIG. 5 is a flowchart of an example process 500 that may be executed by the vehicle 100 system to preserve battery power for battery-intensive vehicle maneuvers. The process 500 may be continually executed while the vehicle 100 is turned on.

At block 505, the processing device 135 may determine the vehicle location. The location of the vehicle 100 may be determined from, e.g., the process 400 or signals output by the navigation module 125.

At decision block 510, the processing device 135 may predict whether the vehicle 100 will need to execute a high-power maneuver within a predetermined amount of time such as, e.g., within the next 60 seconds. The high-power maneuver may be predicted from signals transmitted over the communication bus 140 relative to the location of the vehicle 100 determined at block 505. Examples of signals received over the communication bus 140 may include a turn indicator signal, a steering wheel angle, a profile of antenna signals, signals received from an infrastructure device, and signals received from a remote server. If a high-power maneuver is predicted to occur within the predetermined amount of time, the process 500 may continue at block 515. Otherwise, the process 500 may return to block 505.

At block 515, the processing device 135 may prepare the powertrain or on-board battery 105 for the high-power maneuver. The way the powertrain or on-board battery 105 may be prepared is discussed in greater detail below with respect to FIG. 6.

At decision block 520, the processing device 135 may determine whether the on-board battery 105 and powertrain can provide sufficient power for the vehicle 100 to perform the high-power maneuver. For instance, the processing device 135 may monitor the state of charge of the on-board battery 105 and determine if the on-board battery 105 can provide sufficient power for the vehicle 100 to perform the high-power maneuver. If there is sufficient power available, the process 500 may continue at block 540. If the processing device 135 determines that there is not sufficient power available, the process 500 may continue at block 525.

At decision block 525, the processing device 135 may determine whether an alternate route is available. The alternate route may be determined from an output of the navigation module 125. In identifying alternate routes, the processing device 135 may look for low power maneuvers such as, e.g., right turns instead of left turns, avoiding freeway onramps, etc. If a suitable alternate route is available, the process 500 may continue at block 540. Otherwise, the process 500 may proceed to block 530.

At decision block 530, the processing device 135 may determine whether the high-power maneuver can be delayed. For instance, the high-power maneuver may be delayed if e.g., the vehicle 100 will be stopped by a traffic control device before having to execute the high-power maneuver. If the high-power maneuver can be delayed, the process 500 may continue at block 540. If the high-power maneuver cannot be delayed, the process 500 may proceed to block 535.

At block 535, the processing device 135 may abort the maneuver. Aborting the maneuver may include aborting any preparations to the powertrain or on-board battery 105 discussed with regard to FIG. 6. Thus, aborting the maneuver may include the processing device 135 not taking any preparatory actions.

At block 540, the processing device 135 may command the user interface device 120 to alert the driver or other occupant of the output of blocks 520, 525, 530, or 535. For example, the alert may indicate that there is sufficient power available to execute the high-power maneuver (block 520), that there is an alternate route available (block 525), that the maneuver should be delayed (block 530), or that the maneuver should be aborted (block 535). The process 500 may continue at block 545 after the alert has been presented.

At block 545, the processing device 135 may determine the current location of the vehicle 100. As with the location determined at block 505, the current location of the vehicle 100 may be determined from, e.g., the process 400 or outputs of the navigation module 125.

At decision block 550, the processing device 135 may predict whether the vehicle 100 will need to execute a high-power maneuver within a predetermined amount of time such as, e.g., within the next 1 seconds. As discussed above, the high-power maneuver may be predicted from signals transmitted over the communication bus 140 relative to the location of the vehicle 100 determined at block 505, block 545, or both. Examples of signals received over the communication bus 140 may include a turn indicator signal, a steering wheel angle, a profile of antenna signals, signals received from an infrastructure device, and signals received from a remote server. If a high-power maneuver is predicted to occur within the predetermined amount of time, the process 500 may continue at block 555. Otherwise, the process 500 may return to block 545.

At block 555, the processing device 135 may prepare the powertrain or on-board battery 105 for the high-power maneuver. The way the powertrain or on-board battery 105 may be prepared is discussed in greater detail below with respect to FIG. 6.

At block 560, the processing device 135 may determine whether the on-board battery 105 and powertrain can provide sufficient power for the vehicle 100 to perform the high-power maneuver. For instance, the processing device 135 may monitor the state of charge of the on-board battery 105 and determine if the on-board battery 105 can provide sufficient power for the vehicle 100 to perform the high-power maneuver. If there is sufficient power available, the process 500 may continue at block 565. If the processing device 135 determines that there is not sufficient power available, the process 500 may continue at block 570.

At block 565, the processing device 135 may determine that the vehicle 100 can perform the high-power maneuver. Thus, the processing device 135 may allow preparatory actions taken at block 555 to continue.

At block 570, the processing device 135 may abort the maneuver. Aborting the maneuver may include aborting any preparations to the powertrain or on-board battery 105 discussed with regard to FIG. 6. Thus, aborting the maneuver may include the processing device 135 not taking any preparatory actions.

At block 575, the processing device 135 may command the user interface device 120 to alert the driver or other occupant of the output of blocks 565 or 570. For example, the alert may indicate that there is sufficient power available to execute the high-power maneuver (block 565) or that the maneuver should be aborted (block 570). The process 500 may proceed with block 505 after the alert has been presented.

Figure 6:
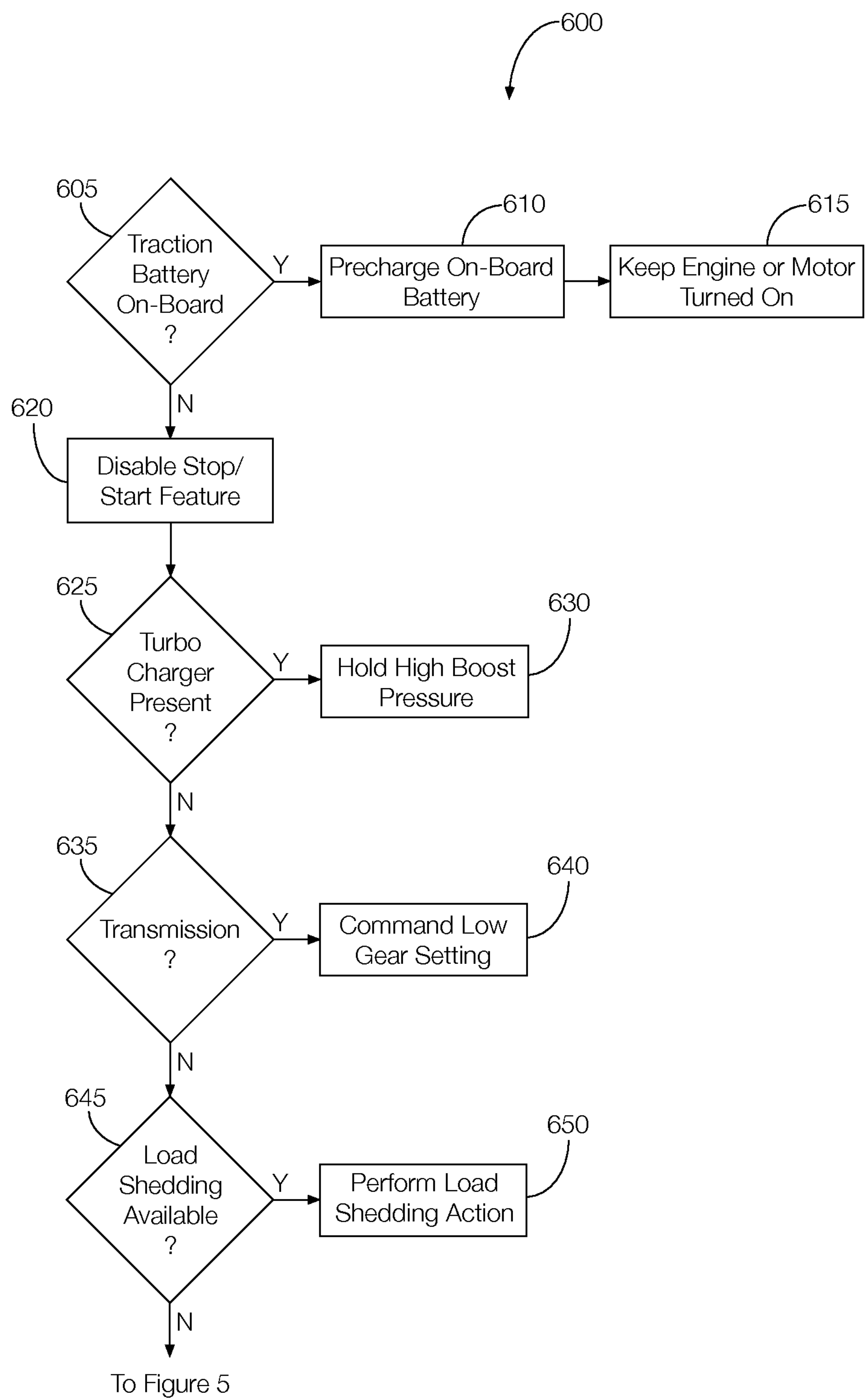
FIG. 6 is a flowchart of an example process for selecting a preparatory action to take if the battery state of charge is insufficient for the vehicle to perform the high-power maneuver.

FIG. 6 is a flowchart of an example process 600 for selecting a preparatory action to take if the battery state of charge is currently insufficient for the vehicle 100 to perform the high-power maneuver. The process 600 may be executed at, e.g., blocks 515 or 555 of the process 500 discussed above with regard to FIG. 5.

At block 605, the processing device 135 may determine whether the on-board battery 105 is a traction battery. If so, the process 600 may continue at block 610. Otherwise, the process 600 may proceed with block 620.

At block 610, the processing device 135 may pre-charge the on-board battery 105 by, e.g., commanding the gasoline engine or generator motor to charge the on-board battery 105. Pre-charging the on-board battery 105 may increase the state of charge of the on-board battery 105 as much as possible before the high-power maneuver is to be executed.

At block 615, the processing device 135 may command that the charging engine or motor remain enabled until the on-board battery 105 state of charge is at capacity or until the vehicle 100 executes the high-power maneuver, whichever occurs first.

At block 620, the processing device 135 may command the engine to remain on. For instance, the processing device 135 may disable any engine stop/start feature employed by the vehicle 100 to improve fuel economy.

At decision block 625, the processing device 135 may determine whether the gasoline engine is equipped with a turbo charger. If so, the process 600 may continue at block 630. If the engine does not have a turbo charger, the process 600 may continue at block 635.

At block 630, the processing device 135 may command the turbo charger to hold a high boost pressure condition. The process 600 may continue with block 635.

At decision block 635, the processing device 135 may determine whether the powertrain is equipped with a transmission. If so, the process 600 may proceed at block 640. Otherwise, the process 600 may continue at block 645.

At block 640, the processing device 135 may command the transmission to operate in a low gear setting. After block 640, the process 600 may proceed to block 645.

At decision block 645, the processing device 135 may determine whether a load shedding action can be performed. For instance, the processing device 135 may determine whether the climate control system is currently on. If so, the process 600 may continue at block 650. Otherwise, the process 600 may end, which may include continuing at block 520 or 560 of the process 500 of FIG. 5.

At block 650, the processing device 135 may perform a load shedding action. An example load shedding action may include, e.g., turning the climate control system off. Performing a load shedding action may make extra power available via the powertrain, on-board battery 105, or both. The process 600 may end or continue at block 520 or 560 of the process 500 of FIG. 5 after block 650.

In general, the computing systems and/or devices described may employ any of a number of computer operating systems, including, but by no means limited to, versions and/or varieties of the Ford Sync® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A vehicle system comprising:

a processing device programmed to monitor a vehicle battery, determine a vehicle location and orientation according to an antenna field pattern, predict a vehicle maneuver associated with the vehicle location, and determine whether the vehicle battery has sufficient charge for a vehicle to execute the predicted maneuver;

wherein the processing device is programmed to perform at least one preparatory action if the vehicle battery lacks sufficient charge for the vehicle to execute the predicted maneuver, wherein the processing device is programmed to determine the vehicle location by comparing the antenna field pattern to a plurality of antenna profiles stored in a profile database, matching the antenna field pattern to at least two of the plurality of antenna profiles stored in the profile database, and selecting the vehicle location by prompting a vehicle occupant to select the vehicle location from a list of possible vehicle locations, wherein each possible vehicle location is associated with one of the plurality of antenna profiles that matched the antenna field pattern, wherein the antenna field pattern is based on signals transmitted from multiple antennas and arriving at the vehicle location from different directions and wherein the processing device is programmed to determine the vehicle orientation according to the directions from which the signals are received.

2. The vehicle system of claim 1, wherein the processing device is programmed to monitor signals over a communication bus and predict the vehicle maneuver based on the monitored signals.

3. The vehicle system of claim 1, wherein the processing device is programmed to predict the vehicle maneuver based at least in part on a location of the vehicle.

4. The vehicle system of claim 1, wherein the processing device is programmed to predict the vehicle maneuver based at least in part on a turn indicator signal.

5. The vehicle system of claim 1, wherein the processing device is programmed to predict the vehicle maneuver based at least in part on a steering wheel angle.

6. The vehicle system of claim 1, wherein the processing device is programmed to predict the vehicle maneuver based at least in part on the vehicle location determined as a result of prompting the vehicle occupant to select the vehicle location from the list of possible vehicle locations.

7. The vehicle system of claim 1, wherein the processing device is programmed to predict the vehicle maneuver based at least in part on signals received from an infrastructure device.

8. The vehicle system of claim 1, wherein the processing device is programmed to predict the vehicle maneuver based at least in part on a vehicle location relative to a reference point.

9. The vehicle system of claim 1, wherein the processing device is programmed to predict the vehicle maneuver based at least in part on signals received from a remote server.

10. The vehicle system of claim 1, wherein the at least one preparatory action includes at least one of pre-charging the vehicle battery, generating an alert, performing a load shedding action, and rerouting the vehicle.

11. A vehicle system comprising:

a vehicle battery;

a processing device programmed to monitor a state of charge of the vehicle battery, determine a vehicle location and orientation according to an antenna field pattern, predict a vehicle maneuver associated with the vehicle location, and determine whether the battery state of charge is sufficient for a vehicle to execute the predicted maneuver;

wherein the processing device is programmed to perform at least one preparatory action if the battery state of charge is insufficient for the vehicle to execute the predicted maneuver, wherein the at least one preparatory action includes at least one of pre-charging the vehicle battery, generating an alert, performing a load shedding action, and rerouting the vehicle, wherein the processing device is programmed to determine the vehicle location by comparing the antenna field pattern to a plurality of antenna profiles stored in a profile database, matching the antenna field pattern to at least two of the plurality of antenna profiles stored in the profile database, and selecting the vehicle location by prompting a vehicle occupant to select the vehicle location from a list of possible vehicle locations, wherein each possible vehicle location is associated with one of the plurality of antenna profiles that matched the antenna field pattern, wherein the antenna field pattern is based on signals transmitted from multiple antennas and arriving at the vehicle location from different directions and wherein the processing device is programmed to determine the vehicle orientation according to the directions from which the signals are received.

12. The vehicle system of claim 11, wherein the processing device is programmed to monitor signals over a communication bus and predict the vehicle maneuver based on the monitored signals.

13. The vehicle system of claim 11, wherein the processing device is programmed to predict the vehicle maneuver based at least in part on at least one of a location of the vehicle, a turn indicator signal, a steering wheel angle, a profile of antenna signals, signals received from an infrastructure device, a vehicle location, and signals received from a remote server.

14. A method comprising:

monitoring a battery state of charge;

determining a vehicle location and orientation according to an antenna field profile by comparing the antenna field pattern to a plurality of antenna profiles stored in a profile database, matching the antenna field pattern to at least two of the plurality of antenna profiles stored in the profile database, and selecting the vehicle location by prompting a vehicle occupant to select the vehicle location from a list of possible vehicle locations, wherein each possible vehicle location is associated with one of the plurality of antenna profiles that matched the antenna field pattern, wherein the antenna field pattern is based on signals transmitted from multiple antennas and arriving at the vehicle location from different directions and wherein the vehicle orientation is determined according to the directions from which the signals are received;

predicting a vehicle maneuver associated with the vehicle location;

determining whether the vehicle state of charge is sufficient for a vehicle to execute the predicted maneuver; and performing at least one preparatory action if the battery state of charge is insufficient for the vehicle to execute the predicted maneuver.

15. The method of claim 14, wherein predicting the vehicle maneuver includes:

monitoring signals over a communication bus; and predicting the vehicle maneuver based on the monitored signals.

16. The method of claim 14, wherein predicting the vehicle maneuver includes predicting the vehicle maneuver based at least in part on the vehicle location determined as a result of prompting the vehicle occupant to select the vehicle location from the list of possible vehicle locations.

17. The method of claim 14, wherein the vehicle maneuver is predicted based at least in part on at least one of a turn indicator signal, a steering wheel angle, a profile of antenna signals, signals received from an infrastructure device, and signals received from a remote server.

18. The method of claim 14, wherein performing the at least one preparatory action includes pre-charging a vehicle battery.

19. The method of claim 14, wherein performing the at least one preparatory action includes commanding a user interface device to output an alert.

20. The method of claim 14, wherein performing the at least one preparatory action includes performing a load shedding action.

* * * * *